United States Patent
Chien

(10) Patent No.: US 9,425,524 B1
(45) Date of Patent: Aug. 23, 2016

(54) ELECTRICAL CONNECTOR MOUNTED ON A CIRCUIT BOARD AND HAVING A RETENTION SECTION WITH A BEARING SECTION AND A LIMITING SECTION

(71) Applicant: KINNEXA, INC., Taipei (TW)

(72) Inventor: Shin-Hao Chien, Taipei (TW)

(73) Assignee: KINNEXA, INC., Taipei (TW)

( * ) Notice: Subject to any disclaimer, the term of this patent is extended or adjusted under 35 U.S.C. 154(b) by 0 days.

(21) Appl. No.: 14/816,083

(22) Filed: Aug. 3, 2015

(51) Int. Cl.
  *H01R 13/62* (2006.01)
  *H01R 12/70* (2011.01)
  *H01R 13/627* (2006.01)

(52) U.S. Cl.
  CPC .......... *H01R 12/7005* (2013.01); *H01R 13/627* (2013.01)

(58) Field of Classification Search
  CPC .. H01R 13/62; H01R 13/627; H01R 13/6277; H01R 13/6278; H01R 13/62905; H01R 13/639
  USPC ............ 439/347, 351, 355, 361, 370
  See application file for complete search history.

(56) References Cited

U.S. PATENT DOCUMENTS

| | | | | |
|---|---|---|---|---|
| 3,550,062 A * | 12/1970 | Drenten | ........... | H01R 12/714 361/776 |
| 4,189,201 A * | 2/1980 | Romania | ........... | H05K 7/1061 439/370 |
| 5,986,892 A * | 11/1999 | Hargy, III | ........... | H05K 7/1429 174/51 |
| 6,375,472 B1 * | 4/2002 | Zeiger | ........... | H05K 3/301 439/61 |
| 6,375,495 B1 * | 4/2002 | Szeto | ........... | H01R 13/518 439/536 |
| 7,365,994 B2 * | 4/2008 | Sun | ........... | G06F 1/181 361/679.55 |
| 2011/0086534 A1 * | 4/2011 | Lim | ........... | H01R 12/73 439/345 |
| 2015/0003001 A1 * | 1/2015 | Yin | ........... | G06F 1/185 361/679.32 |
| 2015/0044904 A1 * | 2/2015 | Hu | ........... | H01R 13/627 439/541.5 |

* cited by examiner

*Primary Examiner* — Chandrika Prasad
(74) *Attorney, Agent, or Firm* — Leong C. Lei

(57) ABSTRACT

An electrical connector includes a mounting frame and a connector mounted on a circuit substrate. The mounting frame includes at least one position constraining plate, which includes at least one fixing section. The fixing section includes two spaced bending portions and an engagement section therebetween. The engagement section is engageable with a retention section of the connector. The retention section includes a bearing section engaging and bearing the engagement section and a limiting section formed on at least one side of the bearing section to limit the position of the mounting frame in a lateral direction. To assemble, the retention section of the connector is first set in alignment with the engagement section of the mounting frame and a force is applied to have them engage with each other. The bearing section provides position constraining in a longitudinal direction, while the limiting section provides position limiting in a lateral direction.

9 Claims, 8 Drawing Sheets

ELECTRICAL CONNECTOR MOUNTED ON A CIRCUIT BOARD AND HAVING A RETENTION SECTION WITH A BEARING SECTION AND A LIMITING SECTION

TECHNICAL FIELD OF INVENTION

The present invention relates generally to an electrical connector, and more particularly to a structure of an electrical connector that provides an effective coupling engagement.

DESCRIPTION OF THE PRIOR ART

In a host device of a server or a computer, an expansion interface card is often installed in the host device to expand connection interfacing of the host device with the external devices. For a regular expansion interface card, at least one connector is provided. The connector is connected to a substrate of the expansion interface card to provide such a function of expansion.

To assemble the expansion interface card to the host device, generally, a bracket must be used for position constraining with respect to an enclosure or casing in order to prevent positional shift of the substrate during insertion of the connector. Heretofore, during a process of assembling the expansion interface card and the bracket, position constraining is achieved only with alignment and abutting of the connector and the bracket. This often leads to positional shift of the substrate during the use. This is generally because fixing support is achieved only with engagement between golden fingers of the expansion interface card and the substrate. This causes a concern about durability for long term use.

Alternatively, the bracket may be extended to form a wing that holds the connector. However, this would require an extremely solid thickness, leading to an excessively large dimension of the entire width and thus incompatibility with enclosures of a regular size.

Thus, it is a challenge of the present inventor and those involved in this business to develop a solution that overcomes the above problems and deficiencies.

SUMMARY OF THE INVENTION

In view of the above drawbacks, through collection of data and assessment and consideration in multiple aspects, in combination with years' experience in the associated business, the present inventor creates, through repeated trivial and modification, a structure of electrical connector that does not alter the original size and allows for efficient assembly and provides firm stability, of which details will be described herein as the present invention.

The primary object of the present invention is to provide an advantage of efficient assembly and firm stability through an engagement technique involving an engagement section and a coupling section.

A structure technique that the present invention adopts to achieve the above object is a structural feature of a mounting frame and a connector, wherein the mounting frame is provided, on a surface thereof, with at least one position constraining plate and the position constraining plate comprises at least one fixing section that is of a structure free of through opening. The fixing section comprises two spaced bending portions and at least one engagement section between the bending portions. Further, the connector comprises at least one retention section raised therefrom to engage and retain the engagement section. The retention section comprises a bearing section and a limiting section formed on at least one side of the bearing section to limit the position of the mounting frame in the lateral direction.

As such, to assemble the connector and the mounting frame, the connector and an opening of the mounting frame are first set in alignment with each other and a force is applied to have the engagement section and the retention section engage with each other. Since the fixing section and the retention section are of elastic stiffness, there is a contraction space therebetween when they are put into engagement with each other to allow the engagement section to smoothly engage the bearing section in such a way that opposite sides are simultaneously limited by the limiting section, whereby the engagement section and the retention section may smoothly engage and fix to each other with position constraining and limiting in the longitudinal and lateral direction being provided to prevent any event of un-engagement or un-stability.

With the above technique, the drawbacks that the prior art connector and bracket may easily induce positional shift of a substrate or a wing extended from the bracket to hold the connector causes an excessively large thickness so as to make the overall thickness excessively large and not compatible with regular enclosures can be overcome and thus the above described advantages of the present invention can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
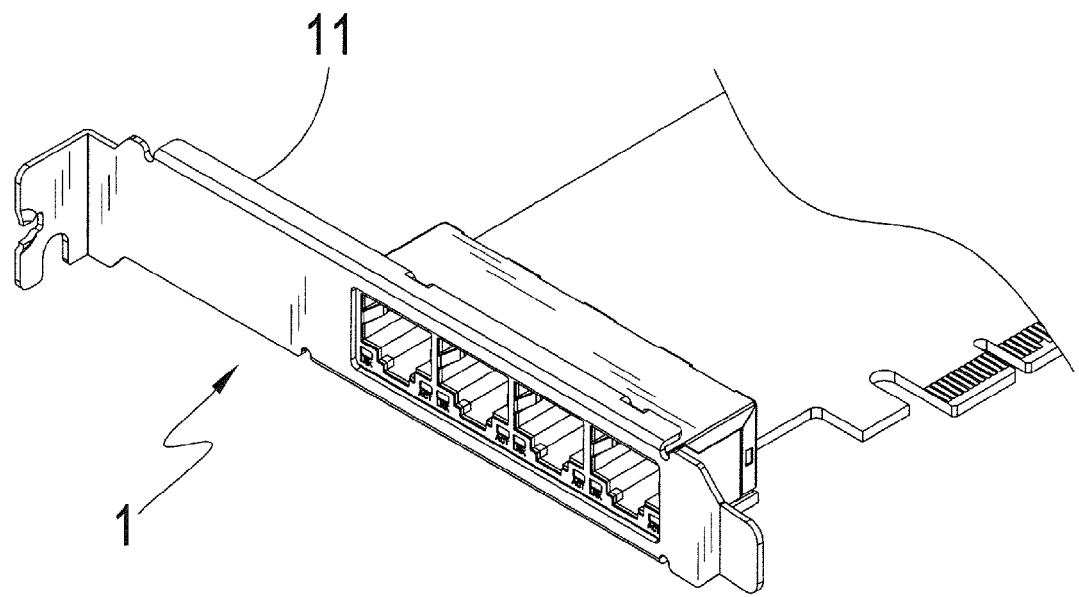
FIG. 1 is a perspective view showing a preferred embodiment of the present invention.
Figure 2:
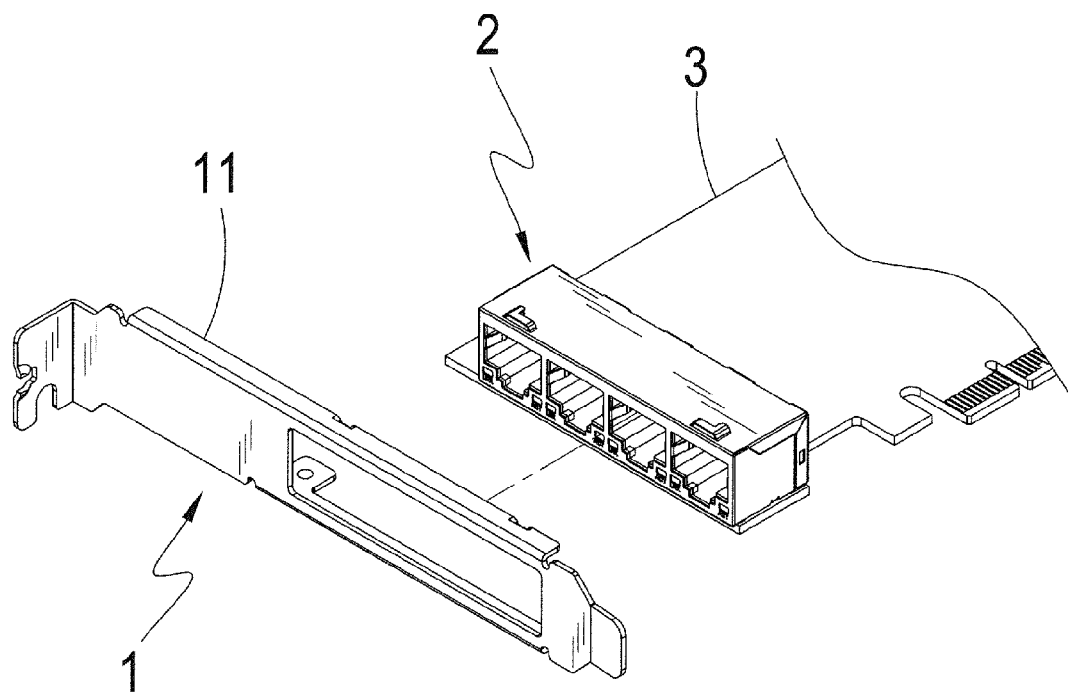
FIG. 2 is an exploded view of the preferred embodiment of the present invention.
Figure 3:
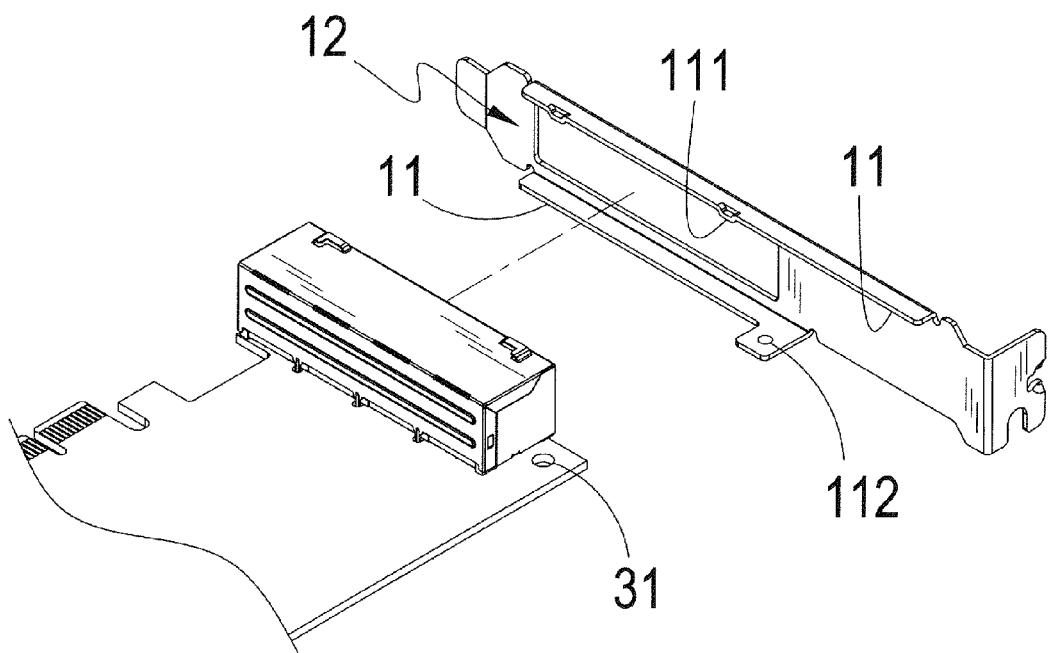
FIG. 3 is an exploded view of the preferred embodiment of the present invention taken from a different perspective.
Figure 3A:
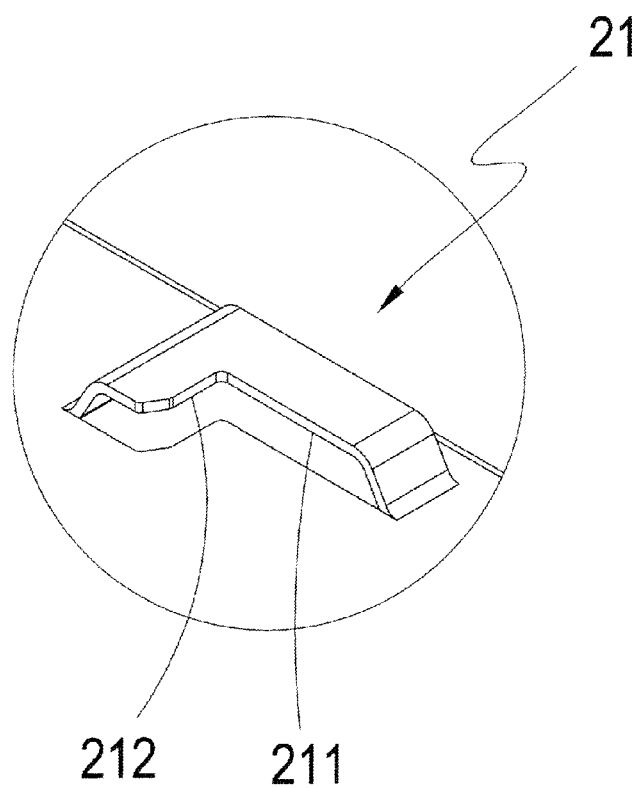
FIG. 3A is an enlarged view of a portion of the preferred embodiment of the present invention.
Figure 3B:
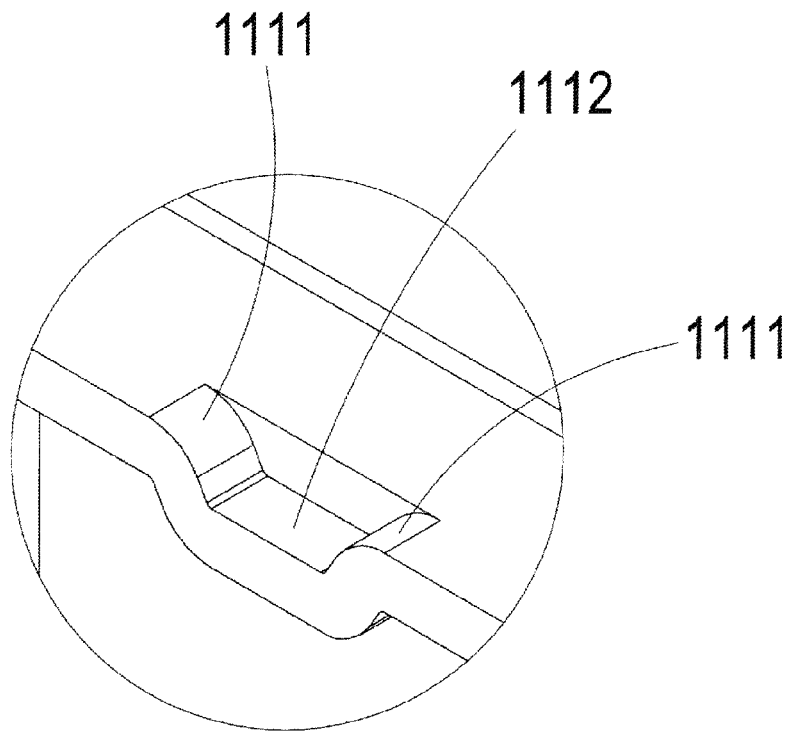
FIG. 3B is an enlarged view of another portion of the preferred embodiment of the present invention.
Figure 4:
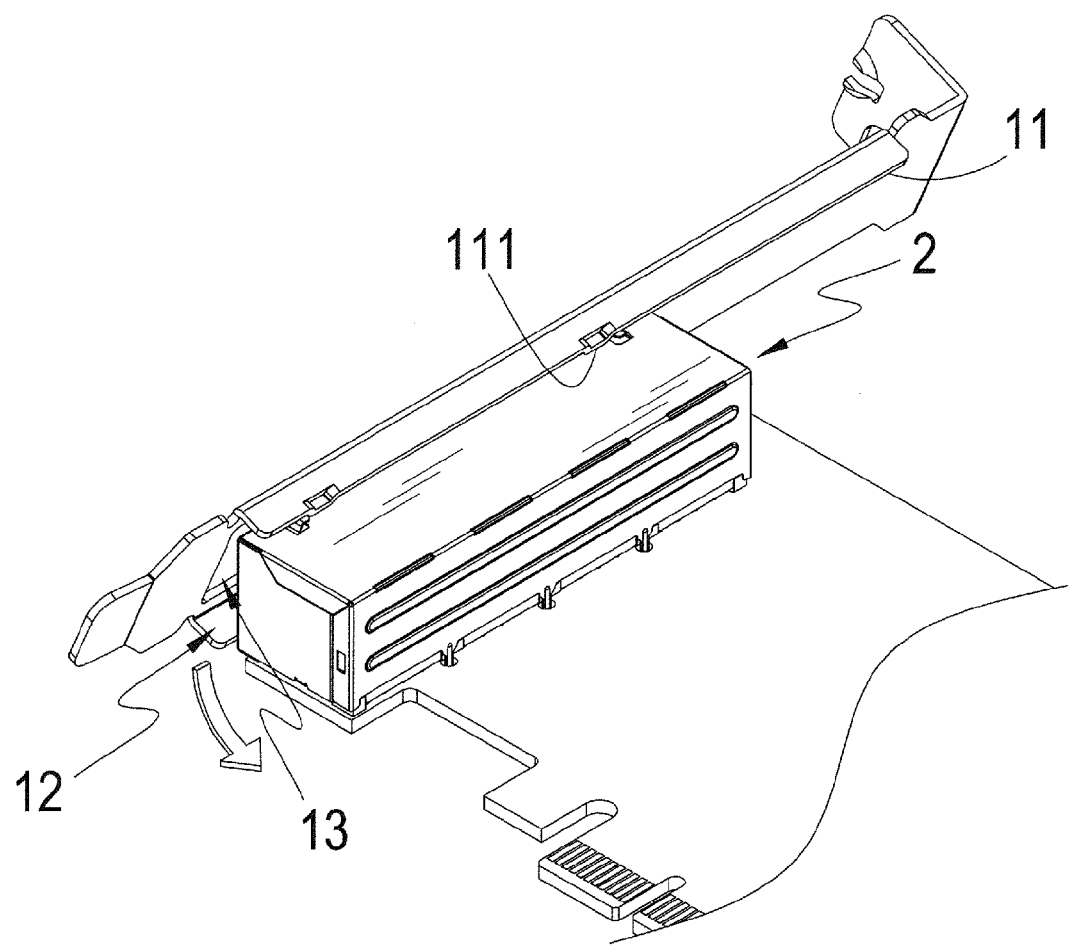
FIG. 4 is a schematic view illustrating assembly of the preferred embodiment of the present invention.
Figure 5:
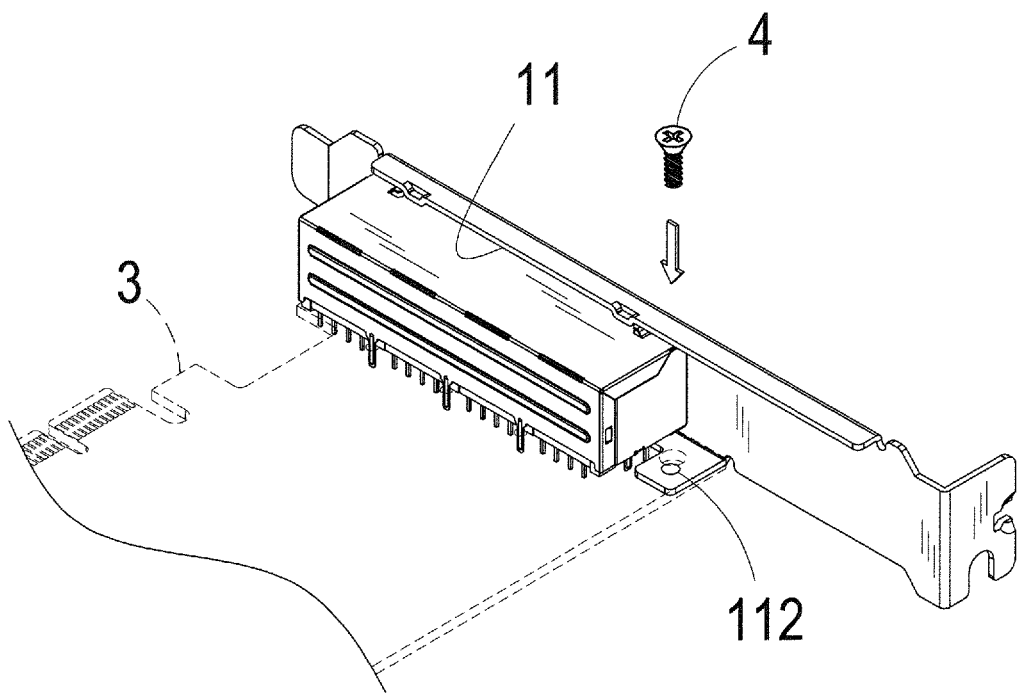
FIG. 5 is another schematic view illustrating the assembly of the preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-3B, which are respectively a perspective view of a preferred embodiment of the present invention, an exploded view of the preferred embodiment of the present invention, an exploded view of the preferred embodiment of the present invention taken from a different perspective, an enlarged view of a portion of the preferred embodiment of the present invention, and an enlarged view of another portion of the preferred embodiment of the present invention, these drawings clearly show that the present invention comprises:

a mounting frame 1, which is coupled to an enclosure of a host device, the mounting frame 1 being formed to include at least one position constraining plate 11, the position constraining plate 11 being provided with at least one fixing section 111 and a coupling section 112 that is engageable with a locking section that will be further described, the fixing section 111 comprising two bending portions 1111 that are spaced from each other and at least one engagement section 1112 between the bending portions 1111; and at least one connector 2, which is mounted to a circuit substrate 3 that comprises a locking section 31, the connector 2 comprising at least one retention section 21 raised therefrom to engage and retain the fixing section 111, the retention section 21 comprising a bearing section 211 and a limiting section 212 formed on at least one side of the bearing section 211 for limiting the position of the mounting frame 1 in a lateral direction.

In the instant embodiment, a plurality of position constraining plates 11 is provided. As shown in the drawings, the position constraining plates 11 are arranged opposite to each other so that a receiving space 12 is formed between the position constraining plates 11 to receive the connector 2 therein.

Further, the fixing section 111 and the retention section 21 are each of predetermined elastic stiffness for engaging each other.

Also referring to FIGS. 2-5, which are respectively an exploded view of the preferred embodiment of the present invention, an exploded view of the preferred embodiment of the present invention taken from a different perspective, an enlarged view of a portion of the preferred embodiment of the present invention, an enlarged view of another portion of the preferred embodiment of the present invention, a schematic view illustrating assembly of the preferred embodiment of the present invention, and another schematic view illustrating the assembly of the preferred embodiment of the present invention, the drawings clearly show that to assemble, the connector 2 is first set in alignment with an opening 13 of the mounting frame 1 and then, the connector 2, in the entirety thereof, is disposed into the receiving space 12 so that the connector 2 is constrained therein and is thus secured with such an arrangement that the position constraining plate 11 supports the connector at both the upper and lower sides, the connector 2; meanwhile, the engagement section 1112 of the fixing section 111 is set in engagement in the bearing section 211 of the retention section 21 through such an arrangement that the bending portions 1111 have slope elasticity thereby achieving position constraining in a longitudinal direction, while position limiting in a lateral direction is achieved with the limiting section 212 so as to provide an advantage of superior stability and firmness; afterwards, the locking section 31 and the coupling section 112 are brought into alignment with each other and a screw 4 is received through the locking section 31 and the coupling section 112 to secure the circuit substrate 3 and the position constraining plate 11 together, achieving an advantage of fixing in multiple directions. Further, in the instant embodiment, the retention section 21 is made in the form of an L-shape.

Figure 6:
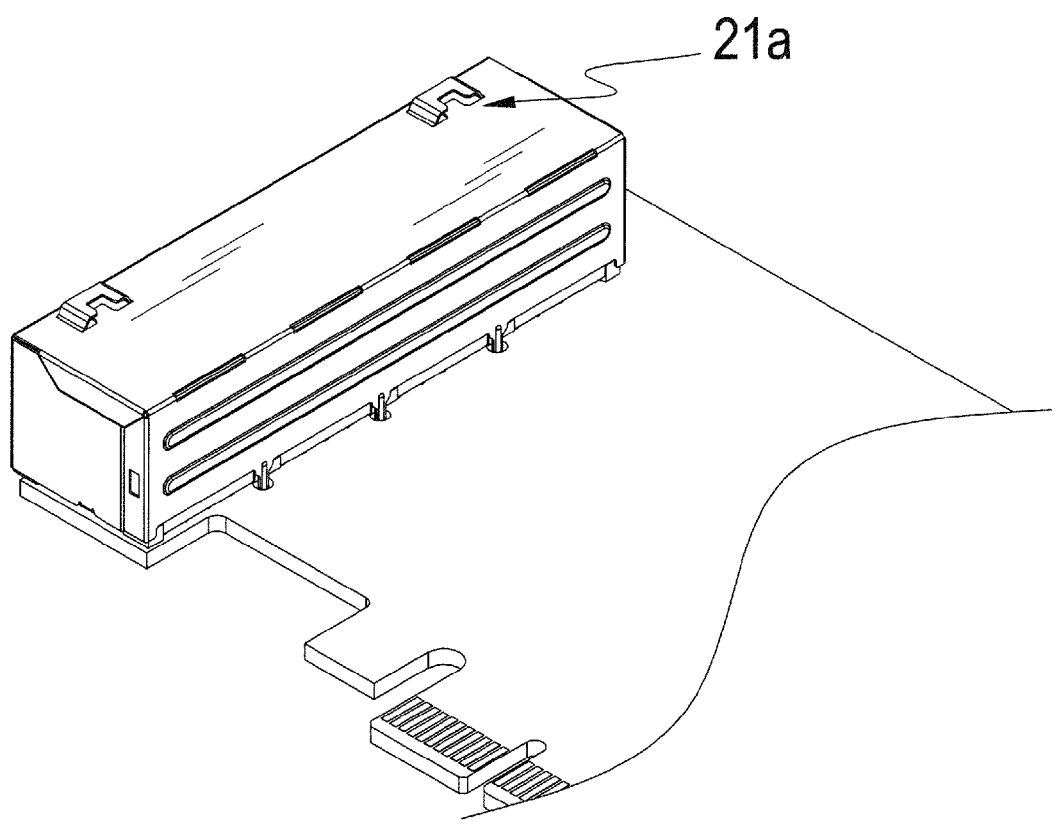
FIG. 6 is a schematic view illustrating another preferred embodiment of the present invention.

Referring to FIG. 6, which is a schematic view illustrating another preferred embodiment of the present invention, the drawing clearly shows as an alternative to an L-shape, the retention section 21a can be of a U-shaped or any other shape so as to achieve an advantage of engageability with the fixing section regardless the shape adopted.

However, what is described above is just some preferred embodiments of the present invention and is not intended to limit the scope of the present invention. Simple modifications and equivalent structure variations, which are made based on the teachings given in the disclosure and drawings of the present invention, are considered within the scope of the present invention.

Thus, referring to all the drawings, the present invention, when put into use, possesses the following advantages over the prior art:

(1) The engagement between the fixing section 111 and the retention section 21 provides an advantage of efficient assembly and secureness.

(2) The position limiting in the lateral direction achieved with the limiting section 212 provides an advantaged of being secureness.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An electrical connector, mainly comprising:
a mounting frame, which is adapted to be coupled to an enclosure of a host device, the mounting frame being formed to include at least one position constraining plate, the position constraining plate being provided with at least one fixing section, the fixing section comprising two bending portions that are spaced from each other and at least one engagement section between the bending portions; and
at least one connector, which is mounted to a circuit substrate, the connector comprising at least one retention section raised therefrom to engage and retain the engagement section, the retention section comprising a bearing section that engages and bears the engagement section and a limiting section formed on at least one side of the bearing section for limiting the position of the mounting frame in a lateral direction.

2. The electrical connector according to claim 1, wherein the position constraining plates are arranged opposite to each other so that a receiving space is formed between the position constraining plates to receive the connector therein.

3. The electrical connector according to claim 1, wherein the circuit substrate comprises a locking section formed thereon.

4. The electrical connector according to claim 3, wherein the position constraining plate comprises a coupling section formed thereon to couple to the locking section.

5. The electrical connector according to claim 1, wherein the fixing section and the retention section are each of elastic stiffness.

6. An electrical connector, mainly comprising:
   at least one connector that is mounted on a circuit substrate; and
   at least one retention section, which is formed on the connector to retain a mounting frame, the retention section comprising a bearing section and a limiting section formed on at least one side of the bearing section for limiting the position of the mounting frame in a lateral direction.

7. The electrical connector according to claim 6, wherein the circuit substrate comprises a locking section formed thereon.

8. The electrical connector according to claim 6, wherein the retention section is of elastic stiffness.

9. The electrical connector according to claim 6, wherein the retention section has a configuration of one of an L-shape and a U-shape.

\* \* \* \* \*